Figures 1, 2, 3:
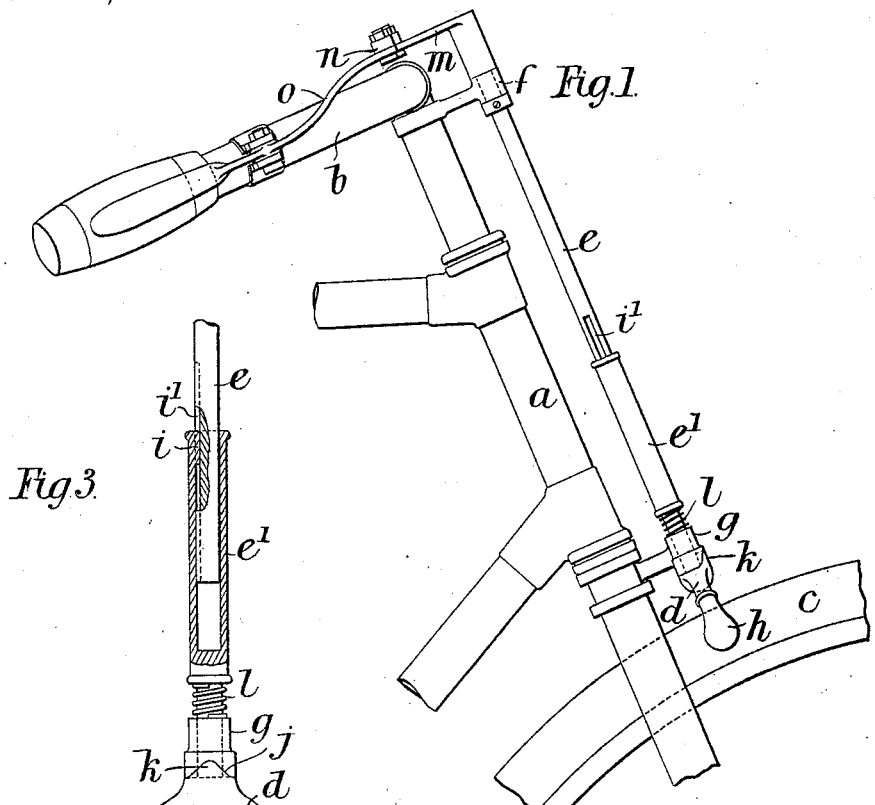

(No Model.)

J. HARRISON.
BICYCLE BRAKE.

No. 606,166. Patented June 21, 1898.

Witnesses

Inventor.
John Harrison

UNITED STATES PATENT OFFICE.

JOHN HARRISON, OF PETERBOROUGH, ENGLAND, ASSIGNOR TO THE ELLIPTIC CYCLE COMPANY, LIMITED, OF SAME PLACE.

BICYCLE-BRAKE.

SPECIFICATION forming part of Letters Patent No. 606,166, dated June 21, 1898.

Application filed December 24, 1897. Serial No. 663,323. (No model.)

*To all whom it may concern:*

Be it known that I, JOHN HARRISON, a subject of the Queen of Great Britain, residing at Peterborough, England, have invented new and useful Improvements in Brakes for Cycles, of which the following is a specification.

This invention relates to a novel construction of cycle-brake, the object of the said invention being to provide a brake which is less injurious to the tire than the usual brake which is pressed against the tread of the tire.

A brake constructed according to this invention is a kind of fork the arms of which normally occupy a position one at each side of the tire and which is pivoted upon an axis substantially radial to the axis of the wheel in such a manner that when the said fork is turned upon its axis the two arms are caused to bear against the sides of the tire with a greater or less pressure, according to the extent to which the fork is turned.

To enable the said invention to be fully understood, it is described by reference to the accompanying drawings, in which—

Figure 1 is a side elevation of so much of a bicycle as is necessary to illustrate the application of the brake thereto, and Fig. 2 is a plan view of the same. Fig. 3 is a sectional front view of parts of the mechanism shown in Fig. 1, but drawn to a larger scale.

$a$ is the head of the bicycle-frame, $b$ the handle-bar, and $c$ the front wheel.

$d$ is the brake-fork, which straddles the wheel $c$ and which in the simplest form would be attached to the lower end of a rod $e$ or shaft carried in two bearing-brackets $f$ $g$ in such a manner that when the said fork is moved from the position shown in full lines in Fig. 2, which is its normal position, say, to the position shown in dotted lines in the said figure the two ends $h$ $h$ of the fork (which are preferably covered with india-rubber) will be caused to bear more or less against the sides of the tire. As shown in the drawings, however, the rod or shaft $e$ is made in two parts telescoping one into the other, the tubular portion $e'$ of the said shaft having a key or feather $i$ upon it, while the other portion of the shaft has a keyway $i'$, this arrangement permitting of the length of the shaft being varied to suit the position in which the handle-bar may be adjusted. The said arrangement of keyway and feather also permits the tubular part $e'$ of the shaft to move longitudinally upon the solid part of the shaft, for the purpose hereinafter described.

To retain the brake in its normal position and to return it to this position after operation, the following arrangement is advantageously provided—that is to say, the lower side of the bracket $g$ is formed with a groove or slot $j$, having inclined sides, and a lug $k$, with corresponding inclines, is formed upon the fork, so that when the fork is turned it will be pressed down in an obvious manner, a spring $l$ surrounding the shank of the fork and pressing at one end upon the top of the bracket $g$ and at the other end upon a ledge or collar on the shank of the fork, serving to return the parts to their normal position. It will be obvious that as the fork moves downward the tubular portion $e'$ of the fork slides upon the solid portion, as hereinbefore described. This arrangement for normally retaining the fork in a higher position than it occupies when the brake is being applied has the further advantage that it allows a large space above the wheel to prevent accumulation of mud against the brake.

Any suitable means may be employed for imparting the desired rotation to the brake. As shown in the drawings, the shaft $e$ has at its upper end an arm $m$, from the free end of which a rod $n$ extends to one end of a lever $o$, the other end of which is arranged in conjunction with one of the handles on the handle-bar, as clearly shown in Figs. 1 and 2.

Having now particularly described and ascertained the nature of my said invention and in what manner the same is to be performed, I declare that what I claim is—

1. In a brake for cycles, a fork straddling the wheel, and means for rotating it so as to cause the arms of said fork to make contact with the sides of the wheel-tire, substantially as described.

2. In a brake for cycles, the combination of a fork straddling the wheel-tire, a shaft made in two parts telescoping one into the other, the lower end of which shaft carries the said fork, and means for forcing down such fork and also for imparting rotary motion to it, substantially as set forth.

3. In a brake wherein a fork which straddles a wheel-tire is adapted to be rotated upon its axis, the combination of a bracket having a groove $j$, a fork having an inclined lug for causing the depression of the said fork, and a spring for returning the fork to its normal position when released, substantially as described.

JOHN HARRISON.

Witnesses:
G. F. REDFERN,
JOHN E. BOUSFIELD.